Feb. 9, 1960  A. FRIEDMAN  2,924,550
METHOD OF MOLDING RESIN AND FIBER COMPOSITIONS
Filed June 25, 1956
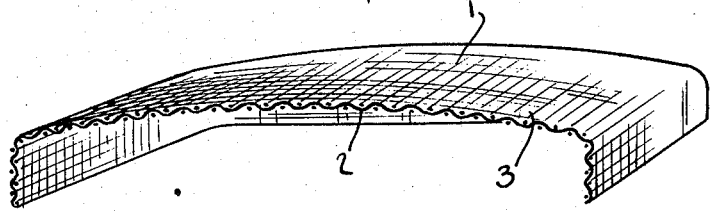
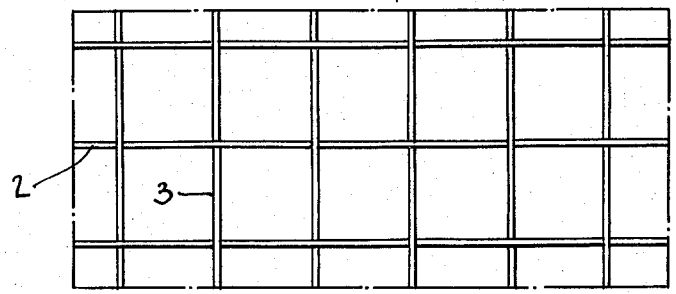
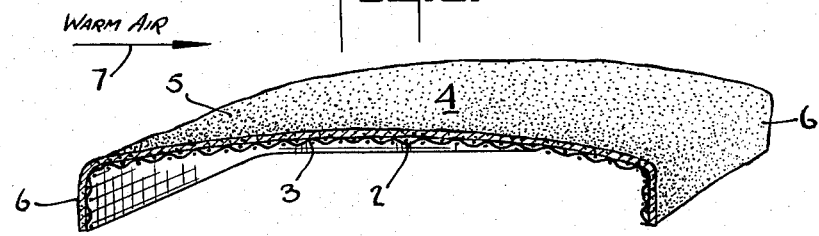
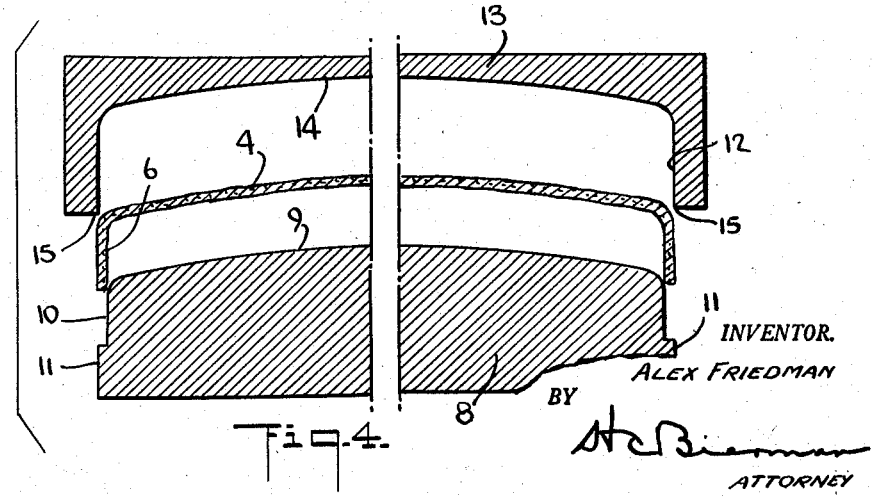
INVENTOR.
ALEX FRIEDMAN
BY
ATTORNEY

United States Patent Office 2,924,550
Patented Feb. 9, 1960

2,924,550

METHOD OF MOLDING RESIN AND FIBER COMPOSITIONS

Alex Friedman, Belle Harbor, N.Y.

Application June 25, 1956, Serial No. 593,518

5 Claims. (Cl. 162—224)

The present invention is directed to the molding of mixtures of fibrous materials and synthetic resins, more particularly it concerns an improved method for accomplishing the molding operation.

It has been the practice in the art to mix paper pulp or the like with a resinous composition in water solution or suspension. The mixture was deposited on a preform mold which was usually of woven mesh material. Then the wet preform was placed in a mold of complicated construction where it was subjected to heat and pressure to consolidate the material and to cause setting of the resin. Since a considerable amount of steam was liberated in the process, provision had to be made for the escape thereof without disrupting or damaging the molded article. This introduced difficulties which were solved by providing passageways in the mold parts and lining the interior of the mold with fine metal mesh. All this was expensive and the time necessary for the molding operation was relatively long requiring considerable equipment for obtaining adequate production.

The present invention is intended and adapted to overcome the disadvantages inherent in the prior art and to provide a process which is quite simple, wherein the equipment is inexpensive, and which gives improved results.

It is also among the objects of the invention to provide a process which is capable of greatly reducing the time necessary in the molding operation and thus considerably increasing production and lowering the cost thereof.

It is further among the objects of the invention to provide a process of the character described, as the result of which the final product has substantially greater strength than similar products made by prior processes.

In practicing the present invention, there is provided a preform of the resinous material and fibrous substances. Such resinous materials may be any of those commonly used for the purpose, such as polyvinyl resins, phenolformaldehyde resins, urea-formaldehyde resins and others. The usual fillers may be used such as pulp fibers, short cotton strands, asbestos fibers and the like. Ordinarily the composition includes plasticizers, coloring matter or other additives. The procedure used in making the preform may be that well known in the art, as by depositing the wet composition on a mesh with the aid of suction, the resulting preform being quite wet, porous and having very little strength so that it must be carefully removed from the mesh and handled gently. The preform may contain from 65% to 70% of water.

Then the preform is placed upon a drying form which is of approximately the shape of the finished molded product. It is of coarse mesh fabric, usually of metal, the spaces between the wires of the mesh being many times the diameter of the wire. The diameter of the wire may, for example, be $\frac{1}{32}''$ to $\frac{3}{32}''$ and the spacing thereof about $\frac{1}{2}''$ to $\frac{7}{8}''$. Ordinarily the spacing is at least ten times the diameter of the wire and may be as much as 25 to 30 times the diameter. As a result the drying form is loosely woven and it is deformable with moderate pressures. The flexibility and elasticity of the fabric enables it to be easily fashioned into the desired shape without the formation of bulges or irregularities. Thereby such forms may be made cheaply and easily even by relatively unskilled workers.

The assembly is heated by any suitable means, as by warm air or in an oven, to a sufficient temperature to evaporate most of the water present and the volatile solvent, if any, in the preform. Usually there remains from 10% to 15% of water, but the preform is dry to the touch. In this operation there is shrinkage due to loss of water and the fibers are enabled to move or slide over each other. Such movement is facilitated by the construction of the drying form wherein, because of the small diameter of the wires and the relatively wide spacing thereof, the pressure of the preform causes corresponding flexing or shrinkage of the drying form. As a result the fibers do not tend to break but are compacted and they interlock to form a strong body. The shrinking and compacting is uniform over the entire area of the body, even in corners, so that the body is equally strong over its entire area. The drying is quite rapid as moisture is released simultaneously on both the inside and the outside of the preform.

In the accompanying drawing constituting a part hereof and in which like reference characters indicate like parts, Fig. 1 is a perspective view of a drying form for an article which may be the cover or bottom of a piece of luggage or suitcase, the front portion of said drying form being broken away to show the structure thereof;

Fig. 2 is a fragmentary plan view of a portion of said drying form showing the coarse mesh thereof;

Fig. 3 is a view similar to Fig. 1 showing the preform in place on the drying form during the drying operation, and Fig. 4 is a diagrammatic, transverse, cross-sectional view of the final mold with the dried preform in place at the beginning of the pressure and heat molding.

Referring to Figs. 1 and 2, the drying form consists of a woven fabric 1 having interlaced wires 2 and 3. The spaces between adjacent wires 2 and adjacent wires 3 are large relative to the diameter of the wires. As shown in Fig. 2, the spaces are about $\frac{1}{2}''$ and the wires have a diameter of about $\frac{1}{32}''$. The wet preform 4 fits loosely on drying form 1 with the top 5 contacting the top of form 1 and the side 6 thereof loosely overhanging the sides of said form. Any of the well known compositions may be used in the preform, such as the following in which the stated proportions are by weight.

Copolymer of vinyl chloride (95%) and vinyl acetate
 (5%) _____ 100
Dioctyl phthalate _____ 30
Wood fibers _____ 185

A current of dry air 7 at a temperature of about 200° to 230° F. is caused to flow over the drying form and, due to the exposure of both the outside and inside of the preform thereto, the bulk of the moisture is quickly removed, the preform shrinks, the drying form flexing therewith, and the fibers interlocking to give a strong body. Then the dried body is lifted from the drying form and transferred to the final molding operation.

As shown diagrammatically in Fig. 4, the final mold consists of a bottom 8, the upper portion of which has a flat surface 9 and depending sides 10, corresponding to top 5 and sides 6 of the preform. Sides 11 of bottom 8 cooperate with surfaces 12 of top member 13 to close the mold. Said top has internal surfaces so shaped as to conform with the outer face of the molded body.

Both the top and bottom of the mold are preferably heated by conventional means (not shown). Top 13 is pressed downwardly over preform 4 until the edges 15 thereof slide over sides 11 of bottom 8 and the preform is compressed. Due to the high temperature of the mold, the plastic composition will become softened and will flow so that any irregularities in the preform will be ironed out. When a thermosetting resin is used, the composition is set and permanently hardened. This requires less than one minute in most cases and usually about 30 seconds or even less for a completion of the molding. The contact surfaces of the mold, namely, portions 9, 10, 12 and 14 are of solid metal without grooves or openings for the escape of vapors; therefore, the surfaces of the molded body are smooth and the construction of the mold is simple, not requiring a high degree of skill in the making thereof.

Whereas the prior complicated molds would become clogged by fibers loosened from the preform entering the grooves, no such difficulties are encountered in this invention. The present molds, because of their simplicity, are sturdier and are less likely to breakage. The drying form can easily be made no matter how complicated the final mold is; the mesh fabric is placed over one of the final mold members and is pressed into position to conform with all the irregularities thereof which can usually be done by hand pressure as the wires, by their flexibility, will be readily deformed by the pressure. The drying mold may then be lifted off and it is ready for use. Although this invention introduces an additional step, in fact the whole operation is facilitated and the cost reduced. For instance, it only requires about one-half minute for the molding while in the prior art from 3 to 8 minutes were necessary to mold a comparable article. Since the prior molds were quite expensive, many more such molds were necessary to give the same production as the present system. In addition to these advantages the resulting molded body is stronger in that there is a greater interlocking of fibers and materially less breakage of fibers during the treatment.

Although the invention has been described setting forth a single specific embodiment thereof, the invention is not to be limited thereto as various changes may be made in the details thereof without departing from the principles described above. For example, other plastic compositions than those specifically described are equally applicable to the present process. The articles made thereby may be of any desired type. The materials used for the drying form may be other than metal. In the drying operation the heating may be by other means than warm air, such as electric heating, radiation or convection. While the contact surfaces of the mold have been described as smooth, they may be engraved to provide a design for decorative or functional purposes, such as ribs on the molded body to impart additional stiffness.

While the process of the invention is applicable to various types of molded articles, it has been found to be particularly suitable in the manufacture of luggage shells as illustrated in the drawing. The process is, of course, also suitable for the manufacture of thin-shelled articles of other and more complicated configurations.

I claim:

1. In a method of molding articles of aqueous paper pulp and the like wherein a wet preform of said pulp is formed on a fine wire screen and is thereafter subjected to heat and pressure in a final die to consolidate said pulp, the improvement which comprises removing said wet preform from said fine wire screen and placing said preform on a loose wire mesh having the shape and substantially the size of said final die, the diameter of the wires of said loose wire mesh being sufficiently small relative to the wide spacing thereof as to permit shrinking of said loose wire mesh by the pressure exerted by said wet preform in shrinking during said drying, drying said preform on said mesh to cause both preform and mesh to shrink to the size of said final die upon evaporation of water while retaining the shape thereof, removing the dried preform from said mesh and placing said dried preform in said final die, and subjecting said dried preform to heat and pressure.

2. In a method of molding articles of aqueous paper pulp and the like wherein a wet preform of said pulp is formed on a fine wire screen and is thereafter subjected to heat and pressure in a final die to consolidate said pulp, the improvement which comprises removing said wet preform from said fine wire screen and placing said preform on a loose wire mesh having the shape and substantially the size of said final die, the diameter of the wires of said loose wire mesh being sufficiently small relative to the wide spacing thereof as to permit shrinking of said loose wire mesh by the pressure exerted by said wet preform in shrinking during said drying, the distance between the adjacent wires of said loose wire mesh being at least 10 times the diameter of the wires thereof, drying said preform on said mesh to cause both preform and mesh to shrink to the size of said final die upon evaporation of water while retaining the shape thereof, removing the dried preform from said mesh and placing said dried preform in said final die, and subjecting said dried preform to heat and pressure.

3. In a method of molding articles of aqueous paper pulp and the like wherein a wet preform of said pulp is formed on a fine wire screen and is thereafter subjected to heat and pressure in a final die to consolidate said pulp, the improvement which comprises removing said wet preform from said fine wire screen and placing said preform on a loose wire mesh having the shape and substantially the size of said final die, the diameter of the wires of said loose wire mesh being sufficiently small relative to the wide spacing thereof as to permit shrinking of said loose wire mesh by the pressure exerted by said wet preform in shrinking during said drying, the distance between the adjacent wires of said loose wire mesh being at least one-half inch, drying said preform on said mesh to cause both preform and mesh to shrink to the size of said final die upon evaporation of water while retaining the shape thereof, removing the dried preform from said mesh and placing said dried preform in said final die, and subjecting said dried preform to heat and pressure.

4. In a method of molding articles of aqueous paper pulp and the like wherein a wet preform of said pulp is formed on a fine wire screen and is thereafter subjected to heat and pressure in a final die to consolidate said pulp, the improvement which comprises removing said wet preform from said fine wire screen and placing said preform on a loose wire mesh having the shape and substantially the size of said final die, the diameter of the wires of said loose wire mesh being sufficiently small relative to the wide spacing thereof as to permit shrinking of said loose wire mesh by the pressure exerted by said wet preform in shrinking during said drying, the distance between the adjacent wires of said loose wire mesh being from 10 to 30 times the diameter of the wires thereof, drying said preform on said mesh to cause both preform and mesh to shrink to the size of said final die upon evaporation of water while retaining the shape thereof, removing the dried preform from said mesh and placing said dried preform in said final die, and subjecting said dried preform to heat and pressure.

5. In a method of molding articles of aqueous paper pulp and the like wherein a wet preform of said pulp is formed on a fine wire screen and is thereafter subjected to heat and pressure in a final die to consolidate said pulp, the improvement which comprises removing said wet preform from said fine wire screen and placing said preform on a loose wire mesh having the shape and substantially the size of said final die, the diameter of the wires of said loose wire mesh being sufficiently small relative to the wide spacing thereof as to permit shrinking of said loose wire mesh by the pressure exerted by said wet preform in shrinking during said drying, the distance between the adjacent wires of said loose wire mesh being about ½″ to ⅞″ and the diameter of the wires thereof being about 1/32″ to 3/32″, drying said preform on said mesh to cause both preform and mesh to shrink to the size of said final die upon evaporation of water while retaining the shape thereof, removing the dried preform from said mesh and placing said dried preform in said final die, and subjecting said dried preform to heat and pressure.

References Cited in the file of this patent

UNITED STATES PATENTS

| | | |
|---|---|---|
| 1,785,484 | Kastner et al. | Dec. 16, 1930 |
| 1,951,940 | Manson | Mar. 20, 1934 |
| 2,163,585 | Chaplin | June 27, 1939 |
| 2,234,979 | Randall et al. | Mar. 18, 1941 |
| 2,314,203 | Fairclough | Mar. 16, 1943 |
| 2,384,958 | Pare | Sept. 18, 1945 |
| 2,409,645 | Sawyer | Oct. 22, 1946 |
| 2,471,932 | Chaplin | May 3, 1949 |
| 2,563,897 | Wilson et al. | Aug. 14, 1951 |
| 2,760,412 | Lemieux | Aug. 28, 1956 |